US012565556B2

(12) United States Patent
Shin et al.

(10) Patent No.: US 12,565,556 B2
(45) Date of Patent: Mar. 3, 2026

(54) MODIFIED CONJUGATED DIENE-BASED POLYMER AND METHOD FOR PREPARING THE SAME

(71) Applicant: LG CHEM, LTD., Seoul (KR)

(72) Inventors: Hye Jung Shin, Daejeon (KR); Ho Young Lee, Daejeon (KR); Jung Hwan Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 812 days.

(21) Appl. No.: 17/799,706

(22) PCT Filed: Oct. 20, 2021

(86) PCT No.: PCT/KR2021/014752
§ 371 (c)(1),
(2) Date: Aug. 15, 2022

(87) PCT Pub. No.: WO2022/092693
PCT Pub. Date: May 5, 2022

(65) Prior Publication Data

US 2023/0116111 A1 Apr. 13, 2023

(30) Foreign Application Priority Data

Oct. 28, 2020 (KR) ........................ 10-2020-0141238

(51) Int. Cl.

| | |
|---|---|
| ***C08F 279/02*** | (2006.01) |
| ***C08C 19/20*** | (2006.01) |
| ***C08F 212/08*** | (2006.01) |
| ***C08F 220/34*** | (2006.01) |
| *B60C 1/00* | (2006.01) |

(52) U.S. Cl.
CPC ............ *C08F 279/02* (2013.01); *C08C 19/20* (2013.01); *C08F 212/08* (2013.01); *C08F 220/34* (2013.01); *B60C 1/00* (2013.01)

(58) Field of Classification Search
CPC .................................................... C08F 279/02
See application file for complete search history.

(56) References Cited

U.S. PATENT DOCUMENTS

| | | | | |
|---|---|---|---|---|
| 4,397,994 | A | 8/1983 | Takeuchi et al. | |
| 2013/0165589 | A1 | 6/2013 | Mruk et al. | |
| 2014/0058044 | A1 * | 2/2014 | Liang | C08F 279/02 525/313 |
| 2015/0183914 | A1 | 7/2015 | Kawai et al. | |
| 2015/0299367 | A1 * | 10/2015 | Matmour | C08C 19/20 525/350 |
| 2018/0223088 | A1 | 8/2018 | Sohn et al. | |

FOREIGN PATENT DOCUMENTS

| | | | |
|---|---|---|---|
| CN | 103172808 | A | 6/2013 |
| CN | 103172809 | A | 6/2013 |
| CN | 104487460 | A | 4/2015 |
| EP | 2607102 | A1 | 6/2013 |
| JP | 2013-136748 | A | 7/2013 |
| JP | 2013-139563 | A | 7/2013 |
| JP | 2014-234441 | A | 12/2014 |
| JP | 2015-229689 | A | 12/2015 |
| KR | 10-2017-0076588 | A | 7/2017 |
| KR | 10-1997538 | B1 | 7/2019 |
| WO | 2020/002460 | A1 | 1/2020 |

OTHER PUBLICATIONS

Zhang, Macromolecules, 2009, 42, 5073-7079 (Year: 2009).*
Office Action issued in corresponding Chinese application 202180014469.9 dated Jan. 2, 2024.
Hermann et al., "Poly(N-isopropylacrylamide)-Modified Styrene-Butadiene Rubber as Thermoresponsive Material," Macromolecular Chemistry and Physics, 215: 32-43 (2014).
International Search Report (with partial translation) and Written Opinion dated Jan. 25, 2022, for corresponding International Patent Application No. PCT/KR2021/014752.

* cited by examiner

*Primary Examiner* — Robert C Boyle
(74) *Attorney, Agent, or Firm* — Morgan, Lewis & Bockius LLP

(57) ABSTRACT

The present invention relates to a modified conjugated diene-based polymer having excellent affinity with a filler and a method for preparing the same, and provides a modified conjugated diene-based polymer including: a first chain comprising a repeating unit derived from a conjugated diene-based monomer; and one or more graft chains comprising a derived unit from an oligomer and graft-bonded to the first chain, wherein the derived unit from an oligomer comprises a residual group derived from a radical reactive functional group, and a molecular weight distribution increase ratio defined by Mathematical Equation 1 is 20% or less, and a method for preparing the same.

14 Claims, No Drawings

MODIFIED CONJUGATED DIENE-BASED POLYMER AND METHOD FOR PREPARING THE SAME

CROSS-REFERENCE TO RELATED APPLICATIONS

The present application claims the benefit of priority based on Korean Patent Application No. 10-2020-0141238, filed on Oct. 28, 2020, the entire contents of which are incorporated herein by reference.

TECHNICAL FIELD

The present invention relates to a modified conjugated diene-based polymer which has excellent affinity with a filler, and a method for preparing the same.

BACKGROUND ART

According to the recent demand for cars having a low fuel consumption ratio, a conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan 5, Goodrich heating, or the like is used as an evaluation index of the vulcanized rubber. That is, it is desirable to use a rubber material having high rebound resilience at the above temperature or a low tan 5 and Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If the solution-polymerized SBR is used as a rubber material for tires, physical properties required for tires such as running resistance and braking force may be controlled by increasing the vinyl content in the SBR and increasing glass transition temperature. The solution-polymerized SBR is prepared by using an anionic polymerization initiator and is being used by coupling or modifying the chain terminals of the polymer thus formed using various modifiers. For example, U.S. Pat. No. 4,397,994 discloses a method of coupling active anions of the chain terminals of a polymer obtained by polymerizing styrene-butadiene using alkyllithium which is a monofunctional initiator in a non-polar solvent, using a coupling agent such as a tin compound.

Meanwhile, as a filler for introducing a functional group to the chain terminals of a polymer, technique of applying an aminoalkoxysilane-based modifier including an alkoxysilane group and an amine group in a molecule, simultaneously, for maximizing the dispersibility and reactivity of a filler, is widely known. However, if the number of amine groups in the modifier increases, there are problems in that solubility to a hydrocarbon solvent which is used for preparing the polymer is lowered, and modification reaction is difficult to easily perform. In addition, though an excessive quantity of functional groups may be introduced to the chain terminals of a polymer, in this case, the improving effects of running resistance is insignificant, and though introducing functional groups in chains, in this case, interaction with a filler is insufficiently performed, and there are no improving effects of running resistance, either.

PRIOR ART DOCUMENT (Patent Document 1) U.S. Pat. No. 4,397,994 A

DISCLOSURE OF THE INVENTION

Technical Problem

The present invention has been devised to solve the above-mentioned problems of the related arts, and an object is to provide a modified conjugated diene-based polymer having excellent affinity with a filler, wherein a graft chain including a derived unit from an oligomer including a functional group having affinity with a filler is graft-bonded to a first chain including a repeating unit derived from a conjugated diene-based monomer.

In addition, another object of the present invention is to provide a method for preparing a modified conjugated diene-based polymer, including a step of performing graft reaction of a first polymer and an oligomer while injecting a radical initiator in at least two installments.

Technical Solution

To solve the above-described tasks, according to an embodiment of the present invention, there is provided a modified conjugated diene-based polymer comprising: a first chain comprising a repeating unit derived from a conjugated diene-based monomer; and one or more graft chains comprising a derived unit from an oligomer and graft-bonded to the first chain, wherein the derived unit from an oligomer comprises a residual group derived from a radical reactive functional group, and a molecular weight distribution increase ratio defined by Mathematical Equation 1 below is 20% or less.

$$\text{Molecular weight distribution increase ratio (\%)} = [(PDI_1/PDI_2)\times 100]-100 \quad \text{[Mathematical Equation 1]}$$

In Mathematical Equation 1, $PDI_1$ is molecular weight distribution of the modified conjugated diene-based polymer, and $PDI_2$ is molecular weight distribution of the first chain.

In addition, the present invention provides a method for preparing the modified conjugated diene-based polymer, comprising: performing graft reaction of a first polymer and an oligomer in the presence of a radical initiator, wherein the first polymer comprises a first chain comprising a repeating unit derived from a conjugated diene-based monomer, and the graft reaction is performed by injecting the radical initiator in at least two installments, where a total amount used of the radical initiator is 0.1 parts by weight to 1.0 part by weight based on 100 parts by weight of the first polymer.

Advantageous Effects

The modified conjugated diene-based polymer according to the present invention may have a reduced molecular weight distribution increase ratio, may include a functional group derived from an oligomer in a polymer through the graft-bonding of a graft chain including a derived unit from an oligomer to a first chain including a repeating unit derived from a conjugated diene-based monomer, and may have excellent affinity with a filler.

The method for preparing a modified conjugated diene-based polymer according to the present invention includes a step of performing graft reaction of a first polymer and an oligomer while injecting a radical initiator in at least two installments, and a modified conjugated diene-based polymer having excellent affinity with a filler may be easily prepared by graft-bonding a graft chain including a derived unit from the oligomer to the first chain, while suitably controlling a molecular weight distribution increase ratio.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

Definition

In the present invention, the term "chain" may mean repeatedly connected derived units of monomers through polymerization reaction of one or more monomers, and the term "polymer" may mean an aggregate of a number of the chains gathered together.

In the present invention, the term "first chain" may mean a stem molecular chain forming the skeleton of a polymer, and the term "graft chain" may mean a molecular chain graft-bonded to the first chain and suspended like a side chain.

In the present invention, the term "graft bond" means a grafted state of a graft chain to a first chain by graft reaction, and the term "graft reaction" may mean reaction phenomenon by which a hydrogen atom is removed from a radical reactive functional group at the terminal of an oligomer by the radical of a radical initiator to be grafted to a first chain through radical graft reaction.

In the present invention, the term "substituted" may mean that hydrogen of a functional group, an atomic group or a compound is substituted with a specific substituent, and if the hydrogen of a functional group, an atomic group or a compound is substituted with a specific substituent, one or a plurality including two or more substituents may be present according to the number of hydrogen present in the functional group, the atomic group or the compound, and if there are a plurality of substituents, each substituent may be the same or different.

In the present invention, the term "alkyl group" may mean monovalent aliphatic saturated hydrocarbon, and may include a linear alkyl group such as methyl, ethyl, propyl and butyl; a branched alkyl group such as isopropyl, sec-butyl, tert-butyl and neo-pentyl; and cyclic saturated hydrocarbon, or cyclic unsaturated hydrocarbon including one or two or more unsaturated bonds.

In the present invention, the term "alkylene group" may mean divalent aliphatic saturated hydrocarbon such as methylene, ethylene, propylene and butylene.

In the present invention, the term "cycloalkyl group" may mean cyclic saturated hydrocarbon.

In the present invention, the term "aryl group" may mean aromatic hydrocarbon, and may include both monocyclic aromatic hydrocarbon in which one ring is formed, and polycyclic aromatic hydrocarbon in which two or more rings are bonded.

In the present invention, the terms "derived unit", "derived repeating unit" and "derived functional group" may mean a component or a structure comes from a certain material, or the material itself.

Measurement Methods and Conditions

In the present disclosure, "weight average molecular weight (Mw)", "number average molecular weight (Mn)" and "molecular weight distribution (MWD" are measured through gel permeation chromatography (GPC) analysis and through confirmation of a molecular weight distribution curve. Molecular weight distribution (PDI, MWD, Mw/Mn) is calculated from each of the molecular weights measured. Particularly, the GPC uses two columns of PLgel Olexis (Polymer laboratories Co.) and one column of PLgel mixed-C (Polymer Laboratories Co.) in combination, and polystyrene (PS) is used as a GPC standard material for calculating the molecular weights, and tetrahydrofuran mixed with 2 wt % of an amine compound is used as a GPC measurement solvent.

In the present disclosure, "mooney viscosity" is measured by using MV-2000 (ALPHA Technologies Co.) using Large Rotor at a rotor speed of 2±0.02 rpm at 100° C., and in this case, a specimen used is stood at room temperature (23±3° C.) for 30 minutes or more, 27±3 g of the specimen is collected and put in a die cavity, and then, the mooney viscosity is measured for 4 minutes while operating Platen.

Modified Conjugated Diene-Based Polymer

The present invention provides a modified conjugated diene-based polymer having excellent affinity with a filler and improved processability, tensile properties and viscoelasticity properties.

The modified conjugated diene-based polymer according to an embodiment of the present invention is characterized in including: a first chain comprising a repeating unit derived from a conjugated diene-based monomer; and one or more graft chains comprising a derived unit from an oligomer and graft-bonded to the first chain, wherein the derived unit from an oligomer comprises a residual group derived from a radical reactive functional group, and a molecular weight distribution increase ratio defined by Mathematical Equation 1 below is 20% or less.

$$\text{Molecular weight distribution increase ratio (\%)} = [(PDI_1/PDI_2)\times 100]-100 \quad \text{[Mathematical Equation 1]}$$

In Mathematical Equation 1, $PDI_1$ is molecular weight distribution of the modified conjugated diene-based polymer, and $PDI_2$ is molecular weight distribution of the first chain.

The modified conjugated diene-based polymer according to an embodiment of the present invention is prepared by a preparation method, which will be explained later, including a step of performing graft reaction of a conjugated diene-based polymer including a repeating unit derived from a conjugated diene-based monomer with an oligomer including a radical reactive functional group, and through this, may have a graft copolymer structure in which one or more graft chains including a derived unit from an oligomer is bonded as a side chain to a first chain including the repeating unit derived from a conjugated diene-based monomer.

The oligomer is a compound including a radical reactive functional group, and particularly, the radical reactive functional group is a functional group which is capable of reacting with a first polymer by a radical initiator, for example, a sulfur-containing functional group, or an oxygen-containing functional group, and the sulfur-containing functional group may be a thiol group, and the oxygen-containing functional group may be an alcohol group (—OH).

In addition, the radical reactive functional group may be any functional groups which may arise reaction by the initiation of radical reaction, without specific limitation, and preferably, the radical reactive functional group may be a sulfur-containing functional group, more particularly, a thiol group.

In addition, the oligomer may include a thiol group at one terminal and may include a cyano group at the other terminal, particularly, may include a repeating unit derived from an amino(meth)acrylate-based monomer and a repeating unit derived from an aromatic vinyl-based monomer, in a molecule, and may include a cyano group and a thiol group at both terminals, respectively. In this case, from the thiol group in the oligomer, a hydrogen atom is removed by the radical initiator to be graft-bonded to the first chain.

Here, the amino(meth)acrylate-based monomer may be 2-(dimethylamino)ethyl methacrylate, 3-(dimethylamino) propyl methacrylate, 2-(diethylamino)ethyl methacrylate, or mixtures thereof.

In addition, the aromatic vinyl-based monomer may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, 1-vinyl-5-hexylnaphthalene, 3-(2-pyrrolidino ethyl)styrene, 4-(2-pyrrolidino ethyl)styrene and 3-(2-pyrrolidino-1-methyl ethyl)-α-methylstyrene.

In addition, the oligomer may have a weight average molecular weight of 350 g/mol to 20,000 g/mol, particularly, 500 g/mol to 15,000 g/mol, or 1,000 g/mol to 10,000 g/mol, and within this range, the affinity of a polymer including thereof with a filler may be easily improved.

In another embodiment, the oligomer may be a compound represented by Formula 1 below.

[Formula 1]

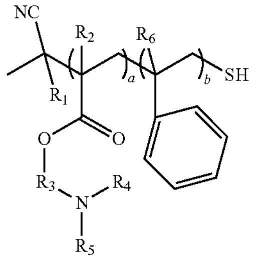

In Formula 1, $R_1$, $R_2$ and $R_6$ are each independently a hydrogen atom or an alkyl group of 1 to 20 carbon atoms, $R_3$ is a substituted with a substituent or unsubstituted alkylene group of 1 to 20 carbon atoms, where the substituent is one or more selected from the group consisting of an alkyl group of 1 to 20 carbon atoms, a cycloalkyl group of 3 to 20 carbon atoms and an aryl group of 6 to 20 carbon atoms, $R_4$ and $R_5$ are each independently a substituted with a substituent or unsubstituted alkyl group of 1 to 20 carbon atoms, a cycloalkyl group of 3 to 20 carbon atoms or an aryl group of 6 to 30 carbon atoms, where the substituent is one or more selected from the group consisting of an alkyl group of 1 to 20 carbon atoms, a cycloalkyl group of 3 to 20 carbon atoms and an aryl group of 6 to 20 carbon atoms, and a and b are each independently an integer of 1 to 200.

More particularly, in Formula 1, $R_1$ and $R_2$ may be each independently an alkyl group of 1 to 10 carbon atoms, $R_3$ may be an unsubstituted alkylene group of 1 to 10 carbon atoms, $R_4$ and $R_5$ may be each independently an unsubstituted alkyl group of 1 to 10 carbon atoms, $R_6$ may be a hydrogen atom, and a and b may be each independently an integer of 1 to 200.

In Formula 1, a and b respectively represent the number of repeating units derived from an amino(meth)acrylate-based monomer and the number of repeating units derived from an aromatic vinyl-based monomer in the oligomer, and a and b may have suitably controlled numbers in a range satisfying the aforementioned weight average molecular weight range of the oligomer.

In addition, according to an embodiment of the present invention, the modified conjugated diene-based polymer may include a first chain including a repeating unit derived from a conjugated diene-based monomer and one or more graft chains including a derived unit from an oligomer and graft-bonded to the first chain. Here, the repeating unit derived from a conjugated diene-based monomer may mean a repeating unit formed during polymerizing a conjugated diene-based monomer, and the derived unit from an oligomer may mean a derived unit from an oligomer.

In addition, according to another embodiment of the present invention, the first chain may further include a repeating unit derived from an aromatic vinyl-based monomer, and in this case, the modified conjugated diene-based polymer may be a copolymer including a repeating unit derived from a conjugated diene-based monomer, a repeating unit derived from an aromatic vinyl-based monomer and a derived unit from an oligomer.

Meanwhile, if the first chain is a copolymer further including a repeating unit derived from an aromatic vinyl-based monomer, the first chain forming the skeleton of the copolymer may be a random copolymer chain, and in this case, excellent effects of balancing among physical properties may be achieved. The random copolymer may mean repeating units forming the copolymer arranged in disorder.

According to an embodiment of the present invention, the conjugated diene-based monomer may be one or more selected from the group consisting of 1,3-butadiene, 2,3-dimethyl-1,3-butadiene, piperylene, 3-butyl-1,3-octadiene, isoprene, 2-phenyl-1,3-butadiene and 2-halo-1,3-butadiene (halo means a halogen atom).

The aromatic vinyl-based monomer may be, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, 1-vinyl-5-hexylnaphthalene, 3-(2-pyrrolidino ethyl)styrene, 4-(2-pyrrolidino ethyl)styrene and 3-(2-pyrrolidino-1-methyl ethyl)-α-methylstyrene.

In another embodiment, the modified conjugated diene-based polymer may be a copolymer further including a repeating unit derived from a diene-based monomer of 1 to 10 carbon atoms together with the repeating unit derived from a conjugated diene-based monomer. The repeating unit derived from a diene-based monomer may be a repeating unit derived from a diene-based monomer which is different from the conjugated diene-based monomer, and the diene-based monomer which is different from the conjugated diene-based monomer may be, for example, 1,2-butadiene. If the modified conjugated diene-based polymer is a copolymer further including a diene-based monomer, the modified conjugated diene-based polymer may include the repeating unit derived from the diene-based monomer in greater than 0 wt % to 1 wt %, greater than 0 wt % to 0.1 wt %, greater than 0 wt % to 0.01 wt %, or greater than 0 wt % to 0.001 wt %, and within this range, effects of preventing gel formation may be achieved.

In addition, the modified conjugated diene-based polymer according to an embodiment of the present invention may have a molecular weight distribution increase ratio defined by Mathematical Equation 1 of 20% or less as described above, and particularly, have a molecular weight distribution increase ratio defined by Mathematical Equation 1 of 8% to 15%, or 10% to 14%.

In addition, the modified conjugated diene-based polymer may have a mooney viscosity increase ratio defined by Mathematical Equation 2 below of 55% or less, particularly, 10% to 50%.

$$\text{Mooney viscosity increase ratio (\%)}=[(MV_1/MV_2)\times 100]-100 \quad \text{[Mathematical Equation 2]}$$

In Mathematical Equation 2, $MV_1$ is mooney viscosity of a modified conjugated diene-based polymer measured at 100° C., and $MV_2$ is mooney viscosity of a first chain measured at 100° C.

In an embodiment of the present invention, the modified conjugated diene-based polymer has a graft copolymer structure in which a graft chain including a derived unit from an oligomer is graft-bonded as a side chain to a first chain including a repeating unit derived from a conjugated diene-based monomer, wherein the molecular weight increase ratio defined by Mathematical Equation 1, or the molecular weight increase ratio defined by Mathematical Equation 1 and the mooney viscosity increase ratio defined by Mathematical Equation 2 are satisfied, and the excessive increase of the molecular weight distribution and the excessive increase of the mooney viscosity may be suppressed, and processability and rolling resistance properties may be excellent.

In addition, the modified conjugated diene-based polymer may have a number average molecular weight (Mn) of 1,000 g/mol to 2,000,000 g/mol, 10,000 g/mol to 1,000,000 g/mol, or 100,000 g/mol to 800,000 g/mol, a weight average molecular weight (Mw) of 1,000 g/mol to 3,000,000 g/mol, 10,000 g/mol to 2,000,000 g/mol, or 100,000 g/mol to 2,000,000 g/mol, and a peak average molecular weight (Mp) of 1,000 g/mol to 3,000,000 g/mol, 10,000 g/mol to 2,000,000 g/mol, or 100,000 g/mol to 2,000,000 g/mol. Within these ranges, excellent effects of rolling resistance and wet skid resistance may be achieved. In another embodiment, the modified conjugated diene-based polymer may have molecular weight distribution (PDI; MWD; Mw/Mn) of 1.0 to 3.0, or 1.1 to 2.5, or 1.1 to 2.0, and within this range, tensile properties and viscoelasticity properties are excellent, and excellent effects of balancing among physical properties may be achieved.

In addition, the modified conjugated diene-based polymer may have a mooney viscosity at 100° C. of 50 to 150, or 55 to 145, and within this range, excellent effects of processability and productivity may be achieved.

In addition, the modified conjugated diene-based polymer may have the vinyl content of 5 wt % or more, 10 wt % or more, or 10 wt % to 60 wt %. Here, the vinyl content may mean the content of not 1,4-added but 1,2-added conjugated diene-based monomer based on 100 wt % of a conjugated diene-based copolymer composed of a monomer having a vinyl group and an aromatic vinyl-based monomer.

Meanwhile, in another embodiment, the first chain may further include a functional group derived from a modifier in at least one terminal, and in this case, the modified conjugated diene-based polymer may include a repeating unit derived from a conjugated diene-based monomer, a functional group derived from a modifier and a derived unit from an oligomer. If the first chain further includes a repeating unit derived from an aromatic vinyl-based monomer, the modified conjugated diene-based polymer may be a copolymer including a first chain including a repeating unit derived from a conjugated diene-based monomer, a repeating unit derived from an aromatic vinyl-based monomer and a functional group derived from a modifier and a second polymer chain including a derived unit from an oligomer. The modifier may be a modifier for modifying at least one terminal of the first chain including the repeating unit derived from a conjugated diene-based monomer, and in a particular embodiment, may be a modifier having affinity with silica. The modifier having affinity with silica may mean a modifier containing a functional group having affinity with silica in a compound used as the modifier, and the functional group having affinity with silica may mean a functional group having excellent affinity with a filler, particularly, a silica-based filler, and making the interaction between the silica-based filler and the functional group derived from the modifier possible.

For example, the modifier may include one or more functional groups selected from an azacyclopropane group, a ketone group, a carboxyl group, a thiocarboxyl group, a carbonate, carboxylic anhydride, a metal carboxylate, an acid halide, an urea group, a thiourea group, an amide group, a thioamide group, an isocyanate group, a thioisocyanate group, a halogenated isocyano group, an epoxy group, a thioepoxy group, an imine group, an alkoxysilyl group, an aminoalkoxysilyl group and an M-Z bond (where M is selected from Sn, Si, Ge and P, and Z is a halogen atom), and may be a compound not including an active proton and an onium salt.

Preparation Method of Modified Conjugated Diene-Based Polymer

In addition, the present invention provides a method for preparing the modified conjugated diene-based polymer.

The method for preparing a modified conjugated diene-based polymer according to an embodiment of the present invention is characterized in comprising: performing graft reaction of a first polymer and an oligomer in the presence of a radical initiator, wherein the first polymer comprises a first polymer chain comprising a repeating unit derived from a conjugated diene-based monomer, and the graft reaction is performed by injecting the radical initiator in at least two installments, where a total amount used of the radical initiator is 0.1 parts by weight to 1.0 part by weight based on 100 parts by weight of the first polymer.

Particular explanation on the oligomer is the same as described above.

The graft reaction step is a step of preparing the modified polymer chain of a branch structure by graft-bonding a graft chain including the derived unit from an oligomer to the first chain in the first polymer, and may be performed through radical graft reaction of the first polymer and the oligomer in the presence of a radical initiator.

The oligomer is used in 1 part by weight to 50 parts by weight, particularly, 1 part by weight to 40 parts by weight based on 100 parts by weight of the first polymer.

The radical initiator is not specifically limited, but may be, for example, 2,2-azobis(isobutyronitrile) (AIBN), dicumyl peroxide (DCPO), di-t-butyl peroxide (DTBT), benzoyl peroxide (BPO), lauroyl peroxide (LPO), potassium persulfate, or mixtures thereof.

In addition, the graft reaction may be performed, while injecting the radical initiator in at least two installments, and in this case, the total amount used of the radical initiator may be 0.1 parts by weight to 2.0 parts by weight, or 0.3 to 1.5 based on 100 parts by weight of the first polymer. In this case, the number of polymer chain radicals may be suitably controlled during the reaction to reduce the side-reaction such as coupling reaction between the first chains, or the like so as to control the molecular weight distribution increase ratio low and the mooney viscosity increase ratio low, thereby preparing a modified conjugated diene-based polymer having the aforementioned molecular weight increase ratio and/or mooney viscosity increase ratio.

Particularly, step (S2) may be performed by initiating the graft reaction of the first chain and the oligomer in the presence of a first radical initiator, injecting a second radical initiator at a point after 30 minutes to 2 hours from the initiation, and conducting the reaction continuously. Here, the first radical initiator and the second radical initiator may be the same material or different materials, and the second radical initiator may be injected at the above-described point once, or injected in at least two installments.

In addition, the second radical initiator may be used in a ratio of 0.1 mol to 1.5 mol based on 1 mol of the first radical initiator.

In addition, the graft reaction in step (S2) may be performed at a temperature of 40° C. to 120° C. for 1 hour to 5 hours, and in this case, the graft reaction may be performed easily.

Meanwhile, in the present invention, the oligomer may be prepared through living radical polymerization, for example, reversible addition-fragmentation chain-transfer polymerization (RAFT).

Particularly, the oligomer may be prepared by a preparation method including a synthesis step performing living radical polymerization reaction of an amino(meth)acrylate-based monomer and an aromatic vinyl-based monomer in the presence of a radical initiator and a chain-transfer agent, and a production step of a thiol group.

For example, the oligomer may be prepared through the steps of Reaction 1 below.

[Reaction 1]

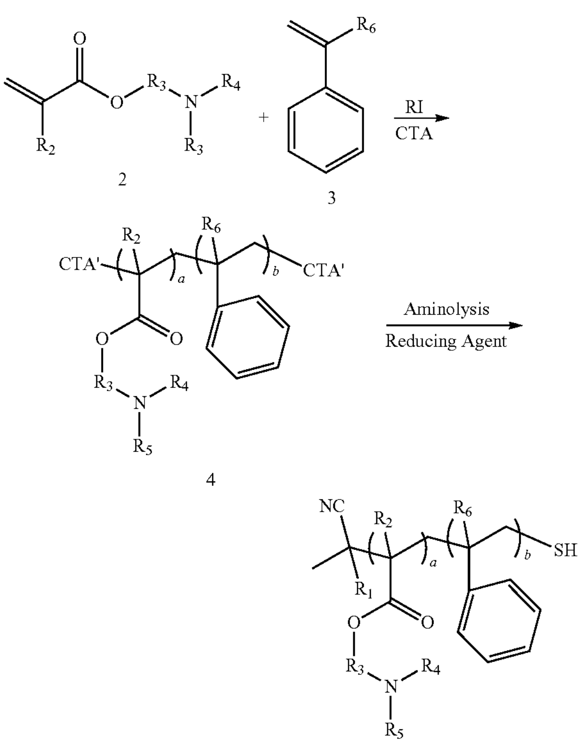

2
3
4
1

In Reaction 1, Formula 2 represents an amino(meth) acrylate-based monomer, Formula 3 represents an aromatic vinyl-based monomer, RI represents a radical initiator, CTA represents a chain-transfer agent, and $R_1$ to $R_5$ are the same as described above.

As in Reaction 1, the oligomer may be prepared by performing polymerization reaction of the amino(meth) acrylate-based monomer and the aromatic vinyl-based monomer in the presence of the radical initiator (RI) and the chain-transfer agent (CTA) to obtain an oligomer intermediate (4) to which a derived unit from the chain-transfer agent is bonded at the terminal thereof, and performing a production step of a thiol group for removing the derived unit from the chain-transfer agent and producing a thiol group.

Here, the radical initiator may use the aforementioned ones.

In addition, the chain-transfer agent may suitably select and use a common chain-transfer agent of dithioesters, trithiocarbonates, dithiocarbamates and xantanes, and may be, for example, 4-cyano [(dodecylsulfanylthiocarbonyl) sulfanyl]pentanoic acid (LPDA), S-dodecyl-S'-(α,α'-dimethyl-α"-acetic acid)trithiocarbonate (DDMAT), 2-cyano-2-propyl benzodithioate (CPDB), or mixtures thereof.

Meanwhile, the production step of a thiol group is for removing the derived unit from the chain-transfer agent present at the terminal from the oligomer intermediate and producing a thiol group, and may be performed by suitably selecting among reaction using a commonly known radical initiator, thermal decomposition reaction and amination reaction, according to the chain-transfer agent used.

Particularly, the production step of a thiol group may be performed by aminolysis reaction using amine materials as in Reaction 1 above. In this case, by the aminolysis reaction, the derived unit from the chain-transfer agent may be removed from an oligomer precursor though using a small amount of the amine materials, and this reaction may be applied irrespective of the type of the chain-transfer agent.

Meanwhile, the first polymer is a conjugated diene-based polymer including the derived unit from the conjugated diene-based monomer, and may be prepared by the polymerization reaction of the conjugated diene-based monomer according to a common method or by using a polymer sold on the market. In addition, the conjugated diene-based polymer may further include a functional group derived from a modifier, as necessary.

For example, in the case of preparing the conjugated diene-based polymer and using, the conjugated diene-based polymer may be prepared by polymerizing a conjugated diene-based monomer, or a conjugated diene-based monomer and an aromatic vinyl-based monomer in the presence of an organolithium compound in a hydrocarbon solvent, and in the case where the conjugated diene-based polymer includes a functional group derived from a modifier, a step of modification reaction or coupling reaction with a modifier may be additionally performed after the polymerization.

Here, the conjugated diene-based monomer, the aromatic vinyl-based monomer and the modifier may be the same as described above, and the hydrocarbon solvent is not specifically limited, but may be, for example, one or more selected from the group consisting of n-pentane, n-hexane, n-heptane, isooctane, cyclohexane, toluene, benzene and xylene.

In addition, the organolithium compound is not specifically limited, but may be, for example, one or more selected from the group consisting of methyllithium, ethyllithium, propyllithium, isopropyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

Hereinafter, the present invention will be explained in detail referring to embodiments. However, embodiments according to the present invention may be modified into various other types, and the scope of the present invention should not be limited to the embodiments described below. The embodiments of the present invention are provided for completely explaining the present invention to a person having an average knowledge in the art.

Preparation Example 1

To a 500 ml round bottom flask, 28 ml of 0.2 M 2,2-azobis(isobutyronitrile) (AIBN) and 5 g of 2-cyano-2-propyl benzodithioate (CPDB) were put, and 21.7 g of 2-(dimethylamino)ethyl methacrylate, 84.9 g of styrene and 95 ml of toluene were added, followed by reacting at 80° C. for 30 hours, and the reaction product was precipitated in a solvent and separated. The solid thus separated was dissolved in toluene again, and at room temperature (25° C.), 33 g of hexylamine and 2.8 g of a reducing agent were added thereto, followed by stirring for 30 minutes. Then, the reaction product was precipitated in cold hexane to prepare an oligomer represented by Formula 1-1 below. Through $^{1}$H-NMR, the synthesis of an oligomer was confirmed.

[Formula 1-1]

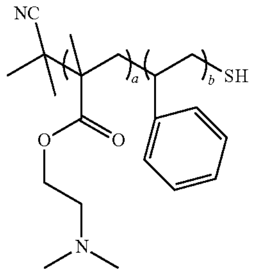

In Formula 1-1, a is 23, and b is 3.

Preparation Example 2

An oligomer represented by Formula 1-2 below was prepared by the same method as in Preparation Example 1-1 except for adding 43.3 g of 2-(dimethylamino)ethyl methacrylate and 63.7 g of styrene, in Preparation Example 1. Through $^{1}$H-NMR, the synthesis of an oligomer was confirmed.

[Formula 1-2]

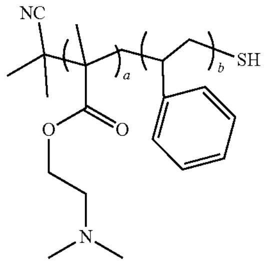

In Formula 1-2, a is 18, and b is 8.

Example 1

(1) Preparation of First Polymer

To a 20 L, autoclave reactor, 5 kg of n-hexane, 211 g of styrene, 769 g of 1,3-butadiene, n-butyllithium and 0.98 g of 2,2-di(2-tetrahydrofuryl)propane as a polar additive were injected, the internal temperature of the reactor was adjusted to 60° C., and adiabatic heating reaction was performed (molar ratio of [DTP]:[act. Li]=5:1). After about 30 minutes, 20 g of 1,3-butadiene was injected for capping the polymer terminals with butadiene, the reaction was quenched using ethanol, and 33 g of a solution in which 30 wt % of Wingstay K antioxidant was dissolved in hexane was added. The resultant polymer obtained was put in hot water heated with steam to remove the solvent to prepare a styrene-butadiene copolymer which was a first polymer. Meanwhile, a portion of the first polymer was taken and used as a specimen for analyzing a first chain.

(2) Preparation of Modified Styrene-Butadiene Copolymer

To a 20 L reactor, 440 g of the first polymer of the styrene-butadiene copolymer prepared in (1) above, 2.49 kg of n-hexane and 5.8 kg of tetrahydrofuran were injected and then, purged with a nitrogen atmosphere. Then, 330 g of a solution in which the oligomer prepared in Preparation Example 1 was dissolved (20 wt % in tetrahydrofuran) was injected thereto, the internal temperature of the reactor was adjusted to 90° C., and after about 20 minutes, 35.2 g of 2.5% lauroyl peroxide was injected to initiate the reaction. After 1 hour from the reaction, 35.2 g of 2.5% lauroyl peroxide was injected, and the reaction was continuously performed. After 1 hour, 17.6 g of 2.56% lauroyl peroxide was additionally injected, and the reaction was continuously performed. After 1 hour, a small amount of ethanol was added, and precipitation in acetone was performed to prepare a modified styrene-butadiene copolymer.

Example 2

(1) Preparation of First Polymer

A first polymer was prepared by the same method as in (1) of Example 1. Meanwhile, a portion of the first polymer was taken and used as a specimen for analyzing a first chain.

(2) Preparation of Modified Styrene-Butadiene Copolymer

To a 20 L reactor, 440 g of the first polymer of the styrene-butadiene copolymer prepared in (1) above, 2.49 kg of n-hexane and 5.8 kg of tetrahydrofuran were injected and then, purged with a nitrogen atmosphere. Then, 330 g of a solution in which the oligomer prepared in Preparation Example 2 was dissolved (20 wt % in tetrahydrofuran) was injected thereto, the internal temperature of the reactor was adjusted to 90° C., and after about 20 minutes, 35.2 g of 2.5% lauroyl peroxide was injected to initiate the reaction. After 1 hour from the reaction, 35.2 g of 2.5% lauroyl peroxide was injected, and the reaction was continuously performed. After 1 hour, 17.6 g of 2.56% lauroyl peroxide was additionally injected, and the reaction was continuously performed. After 1 hour, a small amount of ethanol was added, and precipitation in acetone was performed to prepare a modified styrene-butadiene copolymer.

Example 3

(1) Preparation of First Polymer

To a 20 L, autoclave reactor, 4 kg of n-hexane, 162 g of styrene, 595 g of 1,3-butadiene, n-butyllithium and 0.98 g of 2,2-di(2-tetrahydrofuryl)propane as a polar additive were injected, the internal temperature of the reactor was adjusted to 60° C., and adiabatic heating reaction was performed (molar ratio of [DTP]:[act. Li]=5:1). After about 30 minutes, 20 g of 1,3-butadiene was injected for capping the polymer terminals with butadiene, the reaction was quenched using ethanol, and 33 g of a solution in which 30 wt % of Wingstay K antioxidant was dissolved in hexane was added. The resultant polymer thus obtained was put in hot water heated with steam to remove the solvent to prepare a styrene-butadiene copolymer which was a first polymer. Meanwhile, a portion of the first polymer was taken and used as a specimen for analyzing a first chain.

(2) Preparation of Modified Styrene-Butadiene Copolymer

To a 20 L reactor, 440 g of the first polymer of the styrene-butadiene copolymer prepared in (1) above, 2.49 kg of n-hexane and 5.8 kg of tetrahydrofuran were injected and then, purged with a nitrogen atmosphere. Then, 550 g of a solution in which the oligomer prepared in Preparation Example 1 was dissolved (20 wt % in tetrahydrofuran) was injected thereto, the internal temperature of the reactor was adjusted to 90° C., and after about 20 minutes, 35.2 g of 2.5% lauroyl peroxide was injected to initiate the reaction. After 1 hour from the reaction, 35.2 g of 2.5% lauroyl peroxide was injected, and the reaction was continuously performed. After 1 hour, 17.6 g of 2.56% of lauroyl peroxide was additionally injected, and the reaction was continuously performed. After 1 hour, a small amount of ethanol was added, and precipitation in acetone was performed to prepare a modified styrene-butadiene copolymer.

Example 4

(1) Preparation of First Polymer

A first polymer was prepared by the same method as in (1) of Example 3. Meanwhile, a portion of the first polymer was taken and used as a specimen for analyzing a first chain.

(2) Preparation of Modified Styrene-Butadiene Copolymer

To a 20 L reactor, 440 g of the first polymer of the styrene-butadiene copolymer prepared in (1) above, 2.49 kg of n-hexane and 5.8 kg of tetrahydrofuran were injected and then, purged with a nitrogen atmosphere. Then, 550 g of a solution in which the oligomer prepared in Preparation Example 2 was dissolved (20 wt % in tetrahydrofuran) was injected thereto, the internal temperature of the reactor was adjusted to 90° C., and after about 20 minutes, 35.2 g of 2.5% lauroyl peroxide was injected to initiate the reaction. After 1 hour from the reaction, 35.2 g of 2.5% lauroyl peroxide was injected, and the reaction was continuously performed. After 1 hour, 17.6 g of 2.56% lauroyl peroxide was additionally injected, and the reaction was continuously performed. After 1 hour, a small amount of ethanol was added, and precipitation in acetone was performed to prepare a modified styrene-butadiene copolymer.

Example 5

(1) Preparation of First Polymer

A first polymer was prepared by the same method as in (1) of Example 1. Meanwhile, a portion of the first polymer was taken and used as a specimen for analyzing a first chain.

(2) Preparation of Modified Styrene-Butadiene Copolymer

To a 20 L reactor, 440 g of the first polymer of the styrene-butadiene copolymer prepared in (1) above, 2.49 kg of n-hexane and 5.8 kg of tetrahydrofuran were injected and then, purged with a nitrogen atmosphere. Then, 330 g of a solution in which the oligomer prepared in Preparation Example 1 was dissolved (20 wt % in tetrahydrofuran) was injected thereto, the internal temperature of the reactor was adjusted to 90° C., and after about 20 minutes, 70.4 g of 2.5% lauroyl peroxide was injected to initiate the reaction. After 1 hour from the reaction, 70.4 g of 2.5% lauroyl peroxide was injected, and the reaction was continuously performed. After 1 hour, 35.2 g of 2.56% lauroyl peroxide was additionally injected, and the reaction was continuously performed. After 1 hour, a small amount of ethanol was added, and precipitation in acetone was performed to prepare a modified styrene-butadiene copolymer.

Comparative Example 1

The first polymer prepared in (1) of Example 1 was used as a comparative example.

Comparative Example 2

The first polymer prepared in (1) of Example 3 was used as a comparative example.

Comparative Example 3

(1) Preparation of First Polymer

A first polymer was prepared by the same method as in (1) of Example 1. Meanwhile, a portion of the first polymer was taken and used as a specimen for analyzing a first chain.

(2) Preparation of Modified Styrene-Butadiene Copolymer

To a 20 L reactor, 440 g of the first polymer of the styrene-butadiene copolymer prepared in (1) above, 2.49 kg of n-hexane and 5.8 kg of tetrahydrofuran were injected and then, purged with a nitrogen atmosphere. Then, 330 g of a solution in which the oligomer prepared in Preparation Example 1 was dissolved (20 wt % in tetrahydrofuran) was injected thereto, the internal temperature of the reactor was adjusted to 90° C., after about 20 minutes, 88 g of 2.5% lauroyl peroxide was injected at once, and the reaction was performed for 3 hours. Then, a small amount of ethanol was added, and precipitation in acetone was performed to prepare a modified styrene-butadiene copolymer.

Comparative Example 4

(1) Preparation of First Polymer

A first polymer was prepared by the same method as in (1) of Example 1. Meanwhile, a portion of the first polymer was taken and used as a specimen for analyzing a first chain.

(2) Preparation of Modified Styrene-Butadiene Copolymer

To a 20 L reactor, 440 g of the first polymer of the styrene-butadiene copolymer prepared in (1) above, 2.49 kg of n-hexane and 5.8 kg of tetrahydrofuran were injected and then, purged with a nitrogen atmosphere. Then, 330 g of a solution in which the oligomer prepared in Preparation Example 1 was dissolved (20 wt % in tetrahydrofuran) was injected thereto, the internal temperature of the reactor was adjusted to 90° C., and after about 20 minutes, 70.4 g of 2.5% lauroyl peroxide was injected to initiate the reaction. After 1 hour from the reaction, 70.4 g of 2.5% lauroyl peroxide was injected, and the reaction was continuously performed. After 1 hour, 70.4 g of 2.56% lauroyl peroxide was additionally injected, and the reaction was continuously performed. After 1 hour, a small amount of ethanol was added, and precipitation in acetone was performed to prepare a modified styrene-butadiene copolymer.

Experimental Example 1

With respect to each of the polymers prepared in the Examples and Comparative Examples, a weight average molecular weight (Mw, $\times 10^3$ g/mol), a number average molecular weight (Mn, $\times 10^3$ g/mol), molecular weight distribution (PDI, MWD), a molecular weight increase ratio, mooney viscosity (MV) and a mooney viscosity increase ratio were measured. The results are shown in Table 1 and Table 2 below.

1) Styrene Unit and Vinyl Contents (Wt %)

The styrene unit (SM) and vinyl contents in each polymer were measured and analyzed using Varian VNMRS 500 MHz NMR.

When measuring NMR, 1,1,2,2-tetrachloroethane was used as a solvent, and styrene unit and vinyl contents were calculated by calculating a solvent peak as 5.97 ppm, and regarding 7.2-6.9 ppm as random styrene peaks, 6.9-6.2 ppm as block styrene peaks, 5.8-5.1 ppm as 1,4-vinyl and 1,2-vinyl peaks, and 5.1-4.5 ppm as 1,2-vinyl peaks.

2) Weight average molecular weight (Mw, $\times 10^3$ g/mol), number average molecular weight (Mn, $\times 10^3$ g/mol), molecular weight distribution (PDI, MWD) and a molecular weight distribution increase ratio By gel permeation chromatography (GPC) analysis, a weight average molecular weight (Mw) and a number average molecular weight (Mn) were measured. In addition, molecular weight distribution (PDI, MWD, Mw/Mn) was calculated from each of the molecular weights measured. Particularly, the GPC used two columns of PLgel Olexis (Polymer laboratories Co.) and one column of PLgel mixed-C (Polymer Laboratories Co.) in combination, and polystyrene (PS) was used as a GPC standard material for calculating the molecular weights. A GPC measurement solvent was prepared by mixing tetrahydrofuran and 2 wt % of an amine compound.

In addition, the molecular weight increase ratio was obtained by measuring the molecular weight distribution of the first chain by the GPC analysis using the specimens for analyzing the first chains taken in Examples 1 to 5, Comparative Example 3 and Comparative Example 4, and calculating by Mathematical Equation 1 below.

$$\text{Molecular weight distribution increase ratio (\%)} = [(PDI_1/PDI_2)\times 100]-100 \quad \text{[Mathematical Equation 1]}$$

In Mathematical Equation 1, $PDI_1$ is molecular weight distribution of the modified conjugated diene-based polymer, and $PDI_2$ is molecular weight distribution of the first chain.

3) Mooney Viscosity and Mooney Viscosity Increase Ratio

The mooney viscosity (MV, (ML1+4, @100° C.) MU) was measured by using MV-2000 (ALPHA Technologies Co.) using Large Rotor at a rotor speed of 2±0.02 rpm at 100° C., and in this case, a specimen used was stood at room temperature (23±3° C.) for 30 minutes or more, 27±3 g of the specimen was collected and put in a die cavity, and measurement was conducted by operating a platen for 4 minutes.

In addition, the mooney viscosity increase ratio was obtained by measuring the mooney viscosity of the first chain by the mooney viscosity analysis using the specimens for analyzing the first chain taken in Examples 1 to 5, Comparative Example 3 and Comparative Example 4, and calculating by Mathematical Equation 2 below.

$$\text{Mooney viscosity increase ratio (\%)} = [(MV_1/MV_2)\times 100]-100 \quad \text{[Mathematical Equation 2]}$$

In Mathematical Equation 2, $MV_1$ is mooney viscosity of the modified conjugated diene-based polymer measured at 100° C., and $MV_2$ is mooney viscosity of the first chain measured at 100° C.

TABLE 1

| Division | | Example | | | Comparative Example | | |
|---|---|---|---|---|---|---|---|
| | | 1 | 2 | 5 | 1 | 3 | 4 |
| NMR (wt %) | SM | 21 | 21 | 21 | 21 | 21 | 21 |
| | Vinyl | 50 | 50 | 50 | 50 | 50 | 50 |
| GPC | Mw ($\times 10^3$ g/mol) | 728 | 678 | 701 | 642 | 901 | 796 |
| | Mn ($\times 10^3$ g/mol) | 407 | 391 | 386 | 401 | 395 | 402 |
| | PDI | 1.79 | 1.73 | 1.82 | 1.60 | 2.28 | 1.98 |
| Molecular weight increase ratio (%) | | 11.9 | 8.1 | 13.8 | — | 42.5 | 23.8 |
| Mooney viscosity (MV) | | 77.6 | 80.4 | 87.0 | 63.0 | 111.0 | 105.0 |
| Mooney viscosity increase ratio (%) | | 23.2 | 27.6 | 38.1 | — | 76.2 | 66.7 |

TABLE 2

| Division | | Example 3 | Example 4 | Comparative Example 2 |
|---|---|---|---|---|
| NMR (wt %) | SM | 21 | 21 | 21 |
| | Vinyl | 50 | 50 | 50 |
| GPC | Mw ($\times 10^3$ g/mol) | 477 | 465 | 493 |
| | Mn ($\times 10^3$ g/mol) | 285 | 277 | 308 |
| | PDI | 1.67 | 1.68 | 1.60 |
| Molecular weight increase ratio (%) | | 4.4 | 5.0 | — |
| Mooney viscosity (MV) | | 76.1 | 76.2 | 58.0 |
| Mooney viscosity increase ratio (%) | | 31.2 | 31.4 | — |

As shown in Table 1 and Table 2, it was confirmed that Example 1 to Example 5 showed the molecular weight increase ratio of 20% or less and the mooney viscosity increase ratio of 55% or less. On the contrary, Comparative Example 3 and Comparative Example 4 showed the molecular weight increase ratio of greater than 20% and the mooney viscosity increase ratio of greater than 55%. In this case, in Comparative Example 3 and Comparative Example 4, the radical initiator was not injected in installments during preparing polymers or injected in installments but used an amount deviated from the suggested range in the present invention.

Experimental Example 2

In order to compare and analyze the physical properties of rubber compositions including the polymers prepared in the Examples and Comparative Examples, and molded articles manufactured therefrom, tensile properties and viscoelasticity properties were measured, respectively, and the results are shown in Table 4 and table 5 below.

1) Preparation of Rubber Specimen

Compounding was performed using each of the modified or unmodified conjugated diene-based polymers of the Examples and Comparative Examples as a raw material rubber under the compounding conditions shown in Table 3 below. The raw materials in Table 3 are represented by parts by weight based on 100 parts by weight of the raw material rubber.

TABLE 3

| Division | Raw material | Amount (parts by weight) |
|---|---|---|
| First stage mixing | Rubber | 100 |
| | Silica | 95 |
| | Coupling agent (X50S) | 11.2 |
| | Process oil | 35 |
| | Zinc white | 3 |
| | Stearic acid | 2 |
| | Antioxidant | 2 |
| | Antiaging agent | 2 |
| | wax | 1 |
| Second stage mixing | Sulfur | 1.5 |
| | Rubber accelerator | 1.75 |
| | Vulcanization accelerator | 2 |

Particularly, the rubber specimen was mixed via a first stage mixing and a second stage mixing. In the first stage mixing, a raw material rubber, silica (filler), an organic silane coupling agent (X50S, Evonik), a process oil (TADE oil), zinc oxide (ZnO), stearic acid, an antioxidant (TMQ (RD)) (2,2,4-trimethyl-1,2-dihydroquinoline polymer), an antiaging agent (6PPD ((dimethylbutyl)-N-phenyl-phenylenediamine) and wax (Microcrystalline Wax) were mixed using a banbury mixer equipped with a temperature controlling apparatus. In this case, the initial temperature of a mixing apparatus was controlled to 70° C., and after finishing compounding, a first compound mixture was obtained at a discharge temperature of 145° C. In the second stage mixing, the first compound mixture was cooled to room temperature, and the first compound mixture, sulfur, a rubber accelerator (DPD (diphenylguanine)), and a vulcanization accelerator (CZ (N-cyclohexyl benzothiazylsulfenamide)) were added to the mixing apparatus and mixed at a temperature of 100° C. or less to obtain a second compound mixture. Then, via a curing process at 160° C. for 20 minutes, a rubber specimen was formed.

2) Tensile Properties

Based on ASTM 412 tensile test method, each specimen was manufactured, and tensile strength when breaking the specimen and tensile stress when extending by 200% (200% modulus) were measured. Particularly, tensile properties were measured using a Universal Test Machin 4204 tensile tester (Instron Co.) in a rate of 50 cm/min at room temperature. Meanwhile, in Table 4 and Table 5, tensile strength and 200% modulus are shown by index (%) based on the resultant values of Comparative Example 1, and the higher numerical value represents better results.

3) Viscoelasticity Properties

The viscoelasticity properties were measured using a dynamic mechanical analyzer (GABO Co.) with a film tension mode under a frequency of 10 Hz, and by measuring viscoelasticity behavior on dynamic deformation at each measurement temperature (−60° C. to 60° C.) to confirm a tan 5 value. In the measurement values, if the tan 5 value at a low temperature of 0° C. increases, wet skid resistance becomes better, and if the tan 5 value at a high temperature of 60° C. decreases, hysteresis loss decreases, and rolling resistance (fuel consumption ratio) becomes better. The resultant values in Table 4 and Table 5 are shown by index (%) based on the resultant values of Comparative Example 1, and thus, the higher numerical value means better results.

TABLE 4

| Division | | Example 1 | Example 2 | Example 5 | Comparative Example 1 | Comparative Example 3 | Comparative Example 4 |
|---|---|---|---|---|---|---|---|
| Tensile properties | Tensile strength (Index) | 101 | 99 | 98 | 100 | 99 | 99 |
| | 200% modulus (Index) | 159 | 152 | 161 | 100 | 149 | 149 |
| Viscoelasticity properties | Tan δ (at 0° C., Index) | 101 | 101 | 100 | 100 | 99 | 100 |
| | Tan δ (at 60° C., Index) | 112 | 115 | 112 | 100 | 111 | 110 |

TABLE 5

| Division | | Example 3 | Example 4 | Comparative Example 1 | Comparative Example 2 |
|---|---|---|---|---|---|
| Tensile properties | Tensile strength (Index) | 102 | 99 | 100 | 100 |
| | 200% modulus (Index) | 152 | 154 | 100 | 100 |

TABLE 5-continued

| | | Example | | Comparative Example | |
|---|---|---|---|---|---|
| Division | | 3 | 4 | 1 | 2 |
| Viscoelasticity properties | Tan δ (at 0° C., Index) | 102 | 101 | 100 | 101 |
| | Tan δ (at 60° C., Index) | 115 | 116 | 100 | 99 |

As shown in Table 4 and Table 5, Example 1 to Example 5 showed the equivalent levels of tensile strength and markedly improved 200% modulus and viscoelasticity properties in contrast to Comparative Example 1 and Comparative Example 2, and showed the equivalent levels of tensile strength and improved 200% modulus and/or viscoelasticity properties in contrast to Comparative Example 3 and Comparative Example 4.

From the results of Table 1, Table 2, Table 3 and Table 4, it could be confirmed that the modified conjugated diene-based polymer according to the present invention is prepared by a preparation method in which a radical initiator is used in a specific range and injected in at least two installments, and may have a molecular weight distribution increase ratio adjusted in a specific range and may include a functional group derived from an oligomer in a polymer, and due to such properties, if applied to a rubber composition, the tensile properties and viscoelasticity properties of the rubber composition may be improved.

The invention claimed is:

1. A modified conjugated diene-based polymer comprising:

a first chain comprising a repeating unit derived from a conjugated diene-based monomer; and one or more graft chains comprising a derived unit from an oligomer and graft-bonded to the first chain, wherein the derived unit from the oligomer comprises a residual group derived from a radical reactive functional group, the oligomer comprises: a repeating unit derived from an amino(meth)acrylate-based monomer; and a repeating unit derived from an aromatic vinyl-based monomer, and a molecular weight distribution increase ratio defined by the following Mathematical Equation 1 is 20% or less:

$$\text{Molecular weight distribution increase ratio (\%)} = [(PDI_1/PDI_2)\times 100]-100 \quad \text{[Mathematical Equation 1]}$$

in Mathematical Equation 1, $PDI_1$ is molecular weight distribution of the modified conjugated diene-based polymer, and $PDI_2$ is molecular weight distribution of the first chain.

2. The modified conjugated diene-based polymer according to claim 1, wherein the molecular weight distribution increase ratio is 8% to 15%.

3. The modified conjugated diene-based polymer according to claim 1, wherein the radical reactive functional group includes a sulfur-containing functional group or an oxygen-containing functional group.

4. The modified conjugated diene-based polymer according to claim 1, wherein the oligomer has a weight average molecular weight of 350 g/mol to 20,000 g/mol.

5. The modified conjugated diene-based polymer according to claim 1, wherein the oligomer includes a compound represented by the following Formula 1:

[Formula 1]

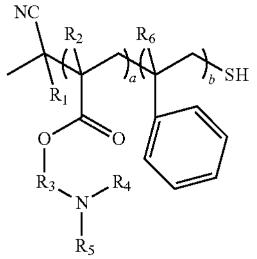

in Formula 1, $R_1$, $R_2$ and $R_6$ are each independently a hydrogen atom or an alkyl group of 1 to 20 carbon atoms, $R_3$ is a substituted with a substituent or unsubstituted alkylene group of 1 to 20 carbon atoms, where the substituent is one or more selected from the group consisting of an alkyl group of 1 to 20 carbon atoms, a cycloalkyl group of 3 to 20 carbon atoms, and an aryl group of 6 to 20 carbon atoms, $R_4$ and $R_5$ are each independently a substituted with a substituent or unsubstituted alkyl group of 1 to 20 carbon atoms, a cycloalkyl group of 3 to 20 carbon atoms or an aryl group of 6 to 30 carbon atoms, where the substituent is one or more selected from the group consisting of an alkyl group of 1 to 20 carbon atoms, a cycloalkyl group of 3 to 20 carbon atoms, and an aryl group of 6 to 20 carbon atoms, and a and b are each independently an integer of 1 to 200.

6. The modified conjugated diene-based polymer according to claim 5, wherein, in Formula 1, $R_1$ and $R_2$ are each independently an alkyl group of 1 to 10 carbon atoms, $R_3$ is an unsubstituted alkylene group of 1 to 10 carbon atoms, $R_4$ and $R_5$ are each independently an unsubstituted alkyl group of 1 to 10 carbon atoms, $R_6$ is a hydrogen atom, and a and b are each independently an integer of 2 to 50.

7. The modified conjugated diene-based polymer according to claim 1, wherein the modified conjugated diene-based polymer has a mooney viscosity increase ratio that is 55% or less as defined by the following Mathematical Equation 2:

$$\text{Mooney viscosity increase ratio (\%)} = [(MV_1/MV_2)\times 100]-100 \quad \text{[Mathematical Equation 2]}$$

in Mathematical Equation 2, $MV_1$ is mooney viscosity of the modified conjugated diene-based polymer, measured at 100° C., and $MV_2$ is mooney viscosity of the first chain, measured at 100° C.

8. The modified conjugated diene-based polymer according to claim 1, wherein the first chain further comprises a repeating unit derived from an aromatic vinyl-based monomer.

9. The modified conjugated diene-based polymer according to claim 1, wherein the first chain further comprises a functional group derived from a modifier in at least one terminal, and the modifier is an alkoxysilane-based compound.

10. The modified conjugated diene-based polymer according to claim 1, wherein the modified conjugated diene-based polymer has a mooney viscosity that is 50 to 150 as measured at 100° C.

11. A method for preparing the modified conjugated diene-based polymer according to claim 1, the method comprising:

performing graft reaction of a first polymer and the oligomer in the presence of a radical initiator, the performing of the graft reaction includes injecting the radical initiator in at least two installments, where a total amount of the radical initiator is 0.1 parts by weight to 1.0 part by weight based on 100 parts by weight of the first polymer, wherein the first polymer comprises a first chain comprising the repeating unit derived from the conjugated diene-based monomer.

12. The method for preparing the modified conjugated diene-based polymer according to claim 11, wherein the oligomer includes a compound represented by the following Formula 1:

[Formula 1]

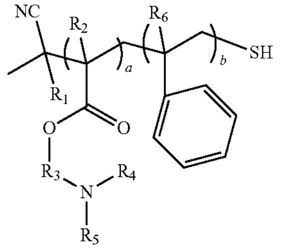

in Formula 1, $R_1$, $R_2$ and $R_6$ are each independently a hydrogen atom or an alkyl group of 1 to 20 carbon atoms, $R_3$ is a substituted with a substituent or unsubstituted alkylene group of 1 to 20 carbon atoms, where the substituent is one or more selected from the group consisting of an alkyl group of 1 to 20 carbon atoms, a cycloalkyl group of 3 to 20 carbon atoms, and an aryl group of 6 to 20 carbon atoms, $R_4$ and $R_5$ are each independently a substituted with a substituent or unsubstituted alkyl group of 1 to 20 carbon atoms, a cycloalkyl group of 3 to 20 carbon atoms or an aryl group of 6 to 30 carbon atoms, where the substituent is one or more selected from the group consisting of an alkyl group of 1 to 20 carbon atoms, a cycloalkyl group of 3 to 20 carbon atoms, and an aryl group of 6 to 20 carbon atoms, and a and b are each independently an integer of 1 to 200.

13. The method for preparing the modified conjugated diene-based polymer according to claim 11, wherein the oligomer is used in 1 part by weight to 50 parts by weight based on 100 parts by weight of the first polymer.

14. The method for preparing the modified conjugated diene-based polymer according to claim 11, wherein the first polymer further comprises a functional group derived from a modifier.

* * * * *